United States Patent [19]
Schink et al.

[11] Patent Number: 5,854,334
[45] Date of Patent: Dec. 29, 1998

[54] WIRE COATING COMPOSITION AND PROCESS FOR PRODUCING THE SAME

[75] Inventors: Michael Schink, Hamburg, Germany; Geoff Rix, Petworth, Sussex; John Kirwin, Billingsley-Bridgenorth Shrops, both of United Kingdom

[73] Assignee: BASF Lacke & Farben, AC, Muenster-Hiltrup

[21] Appl. No.: 894,866

[22] PCT Filed: Mar. 1, 1996

[86] PCT No.: PCT/EP96/00839

§ 371 Date: Nov. 21, 1997

§ 102(e) Date: Nov. 21, 1997

[87] PCT Pub. No.: WO96/27643

PCT Pub. Date: Sep. 12, 1996

[51] Int. Cl.⁶ .............................. C08J 3/00; C08K 3/20; C08L 51/00; C08L 67/00
[52] U.S. Cl. ...................... 524/539; 528/271; 528/289; 528/298; 528/308
[58] Field of Search ............................ 524/539; 528/271, 528/289, 298, 308

[56] References Cited

U.S. PATENT DOCUMENTS 3,374,114  3/1968  Wiener ................................ 117/232

OTHER PUBLICATIONS

Database WPI week 9140 derwent Publications Ltd., London, GB An 91–291110 XP002005637 & Jp, A, 03192739 (Tanaka Denshi Kogyo) 8/22/91.

*Primary Examiner*—Patrick D. Niland

[57] ABSTRACT

The present invention provides wire-coating compositions comprising polyhydric alcohols which are esterified with naphthalenedicarboxylic acid and/or esterifiable derivatives thereof, optionally in a mixture with further dicarboxylic acids and/or their dicarboxylic acid derivatives, catalysts, organic solvents and additives, and optionally imido-containing and/or imido-forming starting materials. The wire-coating compositions of the invention are stable on storage, have good adhesion, especially to copper wires and have desireable thermal pressure and thermal shock. The compositions also have a high solids content at a viscosity which is favorable for processing.

12 Claims, No Drawings

WIRE COATING COMPOSITION AND PROCESS FOR PRODUCING THE SAME

The present invention relates to a wire-coating composition comprising polyester resins or polyesterimide resins or hydroxyl-containing polyesters with an isocyanate component whose free isocyanate groups are completely blocked.

The wire-coating compositions which are customarily employed today are in general solutions of the typical binders, for example polyesters, polyesterimides and hydroxyl-containing polyesters, with blocked isocyanates in solvents, in combination if desired with commercial hydrocarbon diluents.

Wire-coating compositions based on polyester resins are known, for example, from U.S. Pat. No. 3,342,780, U.S. Pat. No. 3,249,578, EP-B-144281 and PCT/EP 92/02776. The hydroxyl component employed in the documents mentioned is tris(2-hydroxyethyl) isocyanurate (THEIC).

The wires coated with wire-coating compositions based on polyester resins are notable for the fact that the enamel film possesses good adhesion to copper wires. Furthermore, the coated wires exhibit a high thermal pressure if the polyester resins used are modified with THEIC.

From PCT/EP92/02776 it is also known that it is possible, by admixing bismaleimide resins, to obtain significant increases in the level of properties of THEIC-modified polyester coating compositions, especially the thermal shock resistance and the thermal pressure.

The disadvantage of the wire-coating compositions based on polyester resins is that the wires coated with polyester resin enamels exhibit a low thermal shock. The THEIC-modified polyester resin enamels are therefore used in the form of two-coat enamels for wires in such a way that the polyester resin coatings form the basecoat on which, for example, polyamideimide wire enamel is applied as topcoat.

Polyesterimide resins are known, for example, from DE-A 1445263 and 1495100 and from WO 91/07469 (PCT/EP 90/01911). Owing to their good mechanical, thermal and chemical properties they have found broad use in mechanical engineering. The polyesterimides cannot match the two-coat enamel with a polyamideimide as topcoat in terms of their thermal and chemical properties.

Electrically insulating coating compositions based on polyurethanes are described, for example, in DE-144749 and DE-1957157. Electrically insulating coating compositions of this kind, when used as wire-coating compositions, are distinguished in particular by their good insulating properties. They have the additional advantage that they can be soldered. Solderable insulated wires, when immersed in a solder bath which has been heated to elevated temperatures, undergo destruction of the insulating layer to expose the bare metal of the conductor, which is therefore directly accessible for electrically conductive connections. The important factor here is that the time for removal of the insulating coat should be as short as possible. The requirement of great thermal lability under soldering conditions stands in opposition to the high thermal stability required of coated wires for use in electrical components. This requirement for improved thermal stability of solderable enamelled wires stands, in principle, in contradiction to the short flux time which is required for rapid processing of the wires.

The object of the present invention is therefore to provide wire-coating compositions, comprising polyester resins or polyesterimide resins or hydroxyl-containing polyesters together with an isocyanate component whose free isocyanate groups are completely blocked, which avoid the disadvantages of the coating compositions known to date and are therefore significantly improved in their profile of properties. The wire-coating compositions according to the invention are in particular to be stable on storage, to have good adhesion, especially to copper wires, to have maximum thermal pressure and high thermal shock. Furthermore, the wire-coating compositions should have a maximum solids content at a viscosity which is favourable for processing. Where polyurethane wire-coating compositions are employed, the intention is at the same time to achieve a shortened flux time.

This object is surprisingly achieved in that the wire-coating composition comprises polyhydric alcohols which are esterified with naphthalenedicarboxylic acid and/or esterifiable derivatives thereof, if desired in a mixture with further dicarboxylic acids and/or their dicarboxylic acid derivatives, catalysts, organic solvents and additives, and, if desired, imido-containing and/or imido-forming starting materials.

In contrast to the cited prior art, therefore, the carboxylic acid components used in accordance with the invention are naphthalenedicarboxylic acids or derivatives thereof. It is surprising and was unforeseeable that modification with naphthalenedicarboxylic acids or derivatives thereof would give wire coatings which adhere very well to electrical conductors, especially to copper wires, and lead to coatings having outstanding technological properties. Above all, the coatings produced with naphthalenedicarboxylic acids feature high thermal pressure and thermal shock, good storage stability, and a high solids content at a viscosity which is favourable for processing.

Particularly suitable naphthalenedicarboxylic acids are 1,4-, 1,8-, 2,3- and 2,6-naphthalenedicarboxylic acid. Particular preference is given to 2,6-naphthalenedicarboxylic acid.

It is also possible to use the esters and acid halides of these compounds. The esterifiable derivatives which can be employed include, in particular, methyl, ethyl, propyl, butyl, amyl, hexyl and octyl naphthalates. It is possible to use the monoesters, the dialkyl esters and also mixtures of these compounds.

The naphthalenedicarboxylic acids or derivatives thereof can be employed as sole acid component or in a mixture with other carboxylic acids.

Examples of carboxylic acids which are suitable for such mixtures with naphthalenedicarboxylic acids or derivatives thereof are phthalic acid, isophthalic acid, terephthalic acid and esterifiable derivatives thereof, for example methyl, ethyl, propyl, butyl, amyl, hexyl and octyl esters. Here too it is possible to employ the monoesters, the dialkyl esters and also mixtures of these compounds. As with the above-mentioned naphthalates, the acid halides are also suitable.

Also suitable in accordance with the invention are aliphatic dicarboxylic acid, for example oxalic acid, malonic acid, succinic acid, glutaric acid, adipic acid, pimelic acid, acelaic acid, sebacic acid, maleic acid, fumaric acid or sorbic acid. The ratio of naphthalenedicarboxylic acids to the other carboxylic acids mentioned is chosen such that the binders contain from 1 to 100 mol % of naphthalenedicarboxylic acid and from 0 to 99 mol % of other dicarboxylic acids, based on 100 mol % total carboxylic acid.

The text below describes individually the components which can be employed for the preparation of the wire-coating compositions according to the invention:

The polyesters are prepared by esterification of the described naphthalenedicarboxylic acids or derivatives, alone or together with other dicarboxylic acids or derivatives thereof, with polyhydric alcohols in the presence of appropriate catalysts.

Particularly suitable alcohols are diols and triols. Examples are ethylene glycol, 1,2- and 1,3-propylene glycol, 1,2-, 1,3- and 1,4-butanediol, 1,5-pentanediol, neopentylglycol, diethylene glycol, triethylene glycol, glycerol, trimethylolethane, trimethylolpropane and THEIC. The latter triol is employed with particular preference for polyester resins. Its use leads to particularly high softening temperatures of the wire-coating composition.

Particular preference is given to the use of a mixture of diols and triols. In this case, mixtures of ethylene glycol and THEIC are employed in particular.

The quantities of the individual components are chosen such that the polyesters have a ratio of hydroxyl to carboxyl groups of from 1.1:1 to 2.0:1, preferably from 1.15:1 to 1.60:1.

In the wire-coating compositions according to the invention which are based on polyester resin, preference is given to the use of ethylene glycol, THEIC, dimethyl 2,6-naphthalenedicarboxylate and dimethyl terephthalate. The hydroxyl number of the polyester is preferably in the range from 95 to 280 mg of KOH/g.

In accordance with the invention, catalysts are employed in quantities of from 0.01 to 5% by weight, based on the mixture used, preferably from 0.3 to 3% by weight. These catalysts are preferably customary esterification catalysts, examples being heavy metal salts, organotitanates, cerium compounds and organic acids.

Examples of heavy metal salts are lead acetate and zinc acetate. Examples of the titanates which can be employed include tetra-n-butyl titanate, tetraisopropyl titanate, tetrapropyl titanate, tetraphenyl titanate, tetracresyl titanate, tetraxylenyl titanate or triethanolamine titanate. Examples of organic acids which can be employed are p-toluenesulphonic acid.

Organic solvents which are suitable for the wire coatings according to the invention are cresolic and non-cresolic organic solvents. Examples are cresol, xylenol, phenol, phenylglycol, butylglycol, methyldiglycol, ethyldiglycol, butyldiglycol. Also suitable are glycol ether esters, for example methylglycol acetate, ethylglycol acetate and butylglycol aceate.

Further examples are cyclic carbonates such as ethylene carbonate, polypropylene carbonate, cyclic esters such as γ-butyrolactone, and other solvents, such as dimethylformamide, N,N-dimethylacetamide, N-methylpyrolidone and benzyl alcohol, [lacuna] are employed if desired in combination with the solvents mentioned.

The organic solvents can in some cases be used with diluents. It is preferred to use either pure solvent or solvent mixtures, such as xylene, toluene, ethylbenzene, cumene, Solventnaphtha®, Solvesso® and Shellsol® grades.

The polyester resin-based wire-coating compositions according to the invention advantageously contain from 0.5 to 5.0% by weight, preferably up to 4.0% by weight, of a phenolic resin, based on the overall weight of the wire-coating composition including the phenolic resin component.

Suitable phenolic resins are known condensation products of phenol, substituted phenols or bisphenol A with formaldehyde. The properties of the phenolic resins depend on the nature of the phenol component and the aldehyde component, on the pH which is established during the preparation and on the ratio of the two reactants. In accordance with the present invention, phenolic resins can also be modified by the incorporation of other compounds during the polycondensation and by subsequent modification of the phenolic resin and by conducting the reaction process in a different way. In addition to the condensation products with formaldehyde, it is of course also possible to use those with other aldehydes.

Consequently, coatings with particularly good properties have the following composition: from 30 to 55% by weight of a polyester resin, from 0.5 to 2.5% by weight of a catalyst, preferably from 0.5 to 1.5% by weight of a catalyst, from 0.5 to 5% by weight of a phenolic resin, preferably from 0.5 to 4.0% by weight, and from 40 to 67% by weight of an organic solvent or solvent mixture, based on the overall weight of the wire coating, which is 100% by weight. Furthermore, the wire-coating compositions according to the invention can also comprise customary auxiliaries and additives. Preferred quantities are up to 1% by weight based on the overall weight of the components.

Examples of auxiliaries which can be employed for the wire-coating compositions are flow-improving melamine resins or flow control agents based on polyacrylates.

The customary process for the preparation of the polyester resins according to the invention is to subject the alcohols to condensation with the carboxylic acid components in an organic solvent, preferably cresol, and to mix the condensation product with a catalyst, a phenolic resin if desired, further auxiliaries and additives. The individual components are employed in the ratios shown above.

The wire-coating compositions according to the invention can comprise the polyester resins described in quantities of from 15 to 65% by weight, preferably from 25 to 55% by weight, in particular from 30 to 55% by weight, based on the overall weight of the wire-coating composition. Very particular preference is given to a quantity of from 40 to 50% by weight.

The wire-coating compositions are processed using customary wire-enamelling machines. In these machines, the thickness of enamel film required in each particular case is built up by a plurality of individual applications, each individual application of enamel being cured without bubbles before the next. Typical oven temperatures are between 300° and 550° C.

The wire-coating compositions prepared in the manner described are surprisingly stable on storage and have a high solids content at a viscosity which is favourable for processing although the incorporated naphthalenedicarboxylic acid has a high molecular weight and a rigid structure. The person skilled in the art would therefore have expected per se that the polyester resin would have a high crystallinity and would therefore be of relatively low solubility.

The coatings obtained, after enamelling and baking, from the wire-coating compositions according to the invention exhibit a surprisingly good adhesion to electrical conductors, especially copper wires. It has surprisingly been found that the coatings resulting from the wire-coating compositions according to the invention have an extraordinarily good profile of properties. In particular, it was not foreseeable that the wires coated with the coatings according to the invention would exhibit not only an outstanding thermal pressure but also an excellent thermal shock resistance and a high tan δ steep rise. It has not hitherto been possible to achieve such a high level of properties with a polyester wire enamel which has not been modified in the manner described.

The polyesterimide resins which can likewise be used in accordance with the invention are prepared by esterifying the above-described naphthalenedicarboxylic acids or derivatives thereof, or mixtures thereof with other carboxylic acids or derivatives thereof, with polyhydric alcohols, with or without the addition of hydroxycarboxylic acids and with the use of imido-forming starting materials. In place of the free acids and alcohols it is also possible to employ their reactive derivatives.

As with the preparation of the polyester resins, suitable polyhydric alcohols are both diols and triols. Examples are ethylene glycol, 1,2- and 1,3-propylene glycol, 1,2-, 1,3- and 1,4-butanediol, 1,5-pentanediol and neopenthylglycol, diethylene glycol, triethylene glycol, glycerol, trimethylolpropane and THEIC. The latter triol is preferably employed. Its use leads to an increase in the softening temperature of the enamel coating composition obtained.

The imido-forming starting materials can be obtained, for example, by reaction between compounds of which one possesses a five-membered cyclic carboxylic anhydride group and at least one further functional group while the other contains not only a primary amino group but also at least one other functional group. These other functional groups are, in particular, carboxyl groups or hydroxyl groups. However, other primary amino groups or carboxylic anhydride groups can also be employed.

Examples of amines which can be employed are, in particular, diprimary diamines, for example ethylenediamine, tetramethylenediamine, hexamethylenediamine, nonamethylenediamine and other aliphatic diprimary diamines. Also suitable are aromatic diprimary diamines, such as diaminodiphenylmethane, diaminodiphenyl ketone, diaminodiphenyl sulphone, diaminodiphenyl sulphoxide, diaminodiphenyl ether, diaminodiphenyl thioether, phenylenediamines and tolylenediamine. Finally, cycloaliphatic diamines, such as 4,4'-dicyclohexylmethanediamine, are suitable. As amino-containing compounds with a further functional group, amino alcohols can also be used, examples being monoethanolamine and monopropanolamines, and also aminocarboxylic acids, such as glycine, aminopropionic acids, aminocaproic acids or aminobenzoic acids.

The polyesterimide resins are prepared using the known catalysts. Suitable examples are heavy metal salts, lead acetates, zinc acetate, and also organic titanates such as tetra-n-butyl titanate, cerium compounds, and organic acids such as p-tuluenesulphonic acid. As catalysts for the curing of the polyesterimides it is likewise possible to use the catalysts mentioned—expediently in a proportion of up to 5% by weight, preferably up to 3% by weight, based on the binder.

The polyesterimides are employed in the wire-coating compositions according to the invention customarily in quantities of from 15 to 65% by weight, preferably from 15 to 60% by weight, in particular from 25 to 55% by weight. Very particularly preferred ranges are from 30 to 55% by weight, in particular from 30 to 50% by weight, based on the overall weight of the wire-coating composition.

The polyurethane-based wire enamels which can likewise be used in accordance with the invention comprise combinations of one or more hydroxyl-containing polyesters having in general an OH number from 200 to 900 mg of KOH/g, preferably from 250 to 750 mg of KOH/g, and one or more blocked isocyanate adducts.

For the preparation of the hydroxyl-containing polyesters, it is possible to employ the same structural components (polycarboxylic acid and polyol) and the same reaction conditions as employed in the preparation of the polyesters or polyesterimide resins.

The appropriate polycarboxylic acids are those described above. Free acids or derivatives thereof can be used. Naphthalenedicarboxylic acid or derivatives thereof are used alone or in a mixture with the above-described polycarboxylic acids or derivatives thereof.

It is known that the modification of hydroxyl-containing polyesters with imide groups improve the thermal properties of the polyurethane wire enamel formulated therefrom. Imido-forming starting materials suitable for the imide modification are the same as those described in the case of the polyesterimides.

Examples of appropriate alcohols are ethylene glycol, 1,2- and 1,3-propylene glycol, 1,2-, 1,3- and 1,4-butanediol, 1,5-pentanediol, neopentylglycol, diethylene glycol, triethylene glycol, glycerol, trimethylolpropane and THEIC. Particular preference is given to employing mixtures of diols and triols.

The catalysts and solvents suitable for the preparation correspond to those which have been mentioned above for the preparation of the polyesters and polyesterimides. In other words, customary esterification catalysts are suitable, such as heavy metal salts, organic titanates, cerium compounds and organic acids. The organic solvents, accordingly, preferably include cresolic and non-cresolic organic solvents.

The isocyanate adducts are prepared by reacting a diisocyanate with a polyol, the quantities of these compounds being chosen such that the ratio of NCO:OH equivalents is between 1:2 and 9:1. The residual free isocyanate groups of this adduct are reacted with a blocking agent.

It is of course also possible, however, to react the isocyanates first with a blocking agent and to react the residual, free isocyanate groups with a diol.

The isocyanate adduct is advantageously synthesized in a solvent which is inert towards isocyanate groups and which readily dissolves the polyurethane produced, in the presence of a catalyst at temperatures of from 30° to 120° C. Examples of suitable diisocyanates are tetramethylene diisocyanate, hexamethylene diisocyanate, 1,4-cyclohexylene diisocyanate, 1,2-cyclohexylene diisocyanate, 1,3-phenylene diisocyanate, 1,4-phenylene diisocyanate, 2,5-tolylene diisocyanate, 2,6-tolylene diisocyanate, 4,4'-bisphenylene diisocyanate, 1,5-naphthylene diisocyanate, 1,4-naphthylene diisocyanate, 1-isocyanatomethyl-5-isocyanato-1,3,3-trimethylcyclohexane, bis(4-isocyanatocyclohexyl) methane, bis(4-isocyanatophenyl)methane and 4,4'-diisocyanatodiphenyl ether. It is preferred to employ tolylene diisocyanate and bis(4-isocyanatophenyl)methane.

Examples of polyols suitable for the formation of adducts are trimethylolpropane, neopenthylglycol, glycerol, hexanetriol, pentaerythritol, ethylene glycol and propylene glycol. Trimethylolpropane is preferably employed. Very particular preference is given to an adduct of 1 mol of trimethylolpropane and 3 mol of tolylene diisocyanate and/or bis(4-isocyanatophenyl)methane.

Blocking agents suitable for blocking the free isocyanate groups are all those which are known. Examples of suitable compounds are aliphatic, cycloaliphatic or aromatic alcohols, for example butanol, isobutanol, 2-ethylenehexanol cyclohexanol, cyclopentanol, benzyl alcohol, phenol and cresol. Others which can be mentioned are hydroxyalkyl ethers, for example butylglycol, amines, for example di-n-butylamine and di-n-hexylamine, oximes, for example methyl ethyl ketooxime, diethyl ketoxime, hydroxylamines and lactams, for example ε-caprolactam, and other compounds containing a hydrogen atom whose reactivity enables the blocking agent to react with isocyanate.

Blocking agents preferably employed are phenols and cresols.

The hydroxyl-containing polyesters and the blocked isocyanate adduct are used in the wire-coating compositions according to the invention, customarily, in a quantity of from 15 to 65% by weight, preferably from 25 to 55% by weight. Particularly preferred ranges are from 18 to 40% by weight, in particular from 25 to 35% by weight, based on the overall weight of the wire-coating composition. The quantity of blocked isocyanate adducts in this context is between 150 and 500 parts by weight per 100 parts by weight of hydroxyl-containing polyesters.

In addition to the components described, the polyurethane-based coating compositions also comprise customary auxiliaries and additives, preferably in the range of from 0 to 1% by weight based on the weight of the binder or based on the weight of binder and curing agent. As auxiliaries for the wire-coating compositions it is possible, for example, to employ flow-improving phenolic or melamine resins, or other customary flow control agents, for example those based on polyacrylates.

The wire-coating compositions based on polyurethane generally also comprise catalysts. Suitable catalysts are metal salts, such as zinc acetate, or amines, which are customarily employed in quantities from 0.5 to 2.0% by weight, based on the overall weight of hydroxyl-containing polyesters and blocked isocyanate adducts.

The polyurethane-based coatings according to the invention are, surprisingly, distinguished by a shortened flux time. At the same time, the requirement of improved thermal stability is met.

Furthermore, the coating compositions have good stability on storage and exhibit good adhesion to copper wires. It is surprising that the properties obtained are not only those mentioned above but also outstanding thermal pressure, excellent thermal shock resistance and a high tan δ steep rise. It is surprising, furthermore, that the coating compositions according to the invention can be processed with a 20% increase in the take-off speed. The invention is illustrated in more detail below with reference to examples.

The binders which are employed in the wire-coating compositions according to the invention (these binders being polyesters, polyesterimides, and hydroxyl-containing polyesters together with a blocked isocyanate adduct) can be prepared by the process of melt condensation or by solution condensation in an appropriate solvent, for example cresol, xylenol, N-methylpyrolidone, methyldiglycol, ethyldiglycol or ethylene glycol.

EXAMPLES

Preparation of 2,6-Naphthalenedicarboxylic Acid-Containing THEIC Polyester Wire Enamels Example 1

53.81 g of ethylene glycol, 29.30 g of cresol, 100.43 g of dimethyl terephthalate, 126.31 g of dimethyl 2,6-naphthalenedicarboxylate, 118.87 [lacuna] of THEIC and 0.31 g of butyl titanate are heated at 200° C. to prepare a polyester resin having a hydroxyl number of from 140 to 260 mg of KOH/g. The THEIC-modified polyester resin is diluted at from 150° to 180° C. in 298.15 g of cresol and 108.38 g of xylenol. After the diluted formulation has cooled to room temperature, 104.27 g of solvent naphtha, 19.48 g of butyl titanate and 40.69 g of a commercial phenolic resin are added.

Viscosity (23° C.): 540 mPas Solids content (1 g, 1 h, 180° C.): 39%

Example 2

49.14 g of ethylene glycol, 26.76 g of cresol, 230.68 g of dimethyl 2,6-naphthalenedicarboxylate, 108.54 [lacuna] of tris-2-hydroxyethyl isocyanurate and 0.27 g of butyl titanate are heated at 200° C. to prepare a polyester resin having a hydroxyl number of from 140 to 260 mg of KOH/g. The THEIC-modified polyester resin is diluted at from 150° to 180° C. in 300.66 g of cresol and 98.97 g of xylenol. After the diluted formulation has cooled to room temperature, 130.04 g of solvent naphtha, 17.79 g of butyl titanate and 37.15 g of a commercial phenolic resin are added.

Viscosity (23° C.): 550 mPas Solids content (1 g, 1 h, 180° C.): 35.1%

Example 3

21.48 g of ethylene glycol, 21.44 g of cresol, 191.25 g of dimethyl 2,6-naphthalenedicarboxylate, 171.26 [lacuna] of THEIC and 0.24 g of butyl titanate are heated at 200° C. to prepare a polyester resin having a hydroxyl number of from 140 to 260 mg of KOH/g. The THEIC-modified polyester resin is diluted at from 150° to 180° C. in 388.79 g of cresol. After the diluted formulation has cooled to room temperature, 160.00 g of solvent naphtha, 14.75 g of butyl titanate and 30.79 g of a commercial phenolic resin are added.

Viscosity (23° C.): 820 mPas Solids content (1 g, 1 h, 180° C.): 40.6%

Example 4

(Comparison Example)

Preparation of a THEIC-Modified Polyester Enamel 55.24 g of ethylene glycol, 30.08 g of cresol, 206.20 g of dimethyl terephthalate, 122.03 [lacuna] of THEIC and 0.32 g of butyl titanate are heated at 200° C. to prepare a polyester resin having a hydroxyl number of from 140 to 260 mg of KOH/g. The THEIC-modified polyester resin is diluted at from 150° to 180° C. in 306.07 g of cresol and 111.26 g of xylenol. After the diluted formulation has cooled to room temperature, 107.03 g of solvent naphtha, 20.00 g of butyl titanate and 41.77 g of a commercial phenolic resin are added.

Viscosity (23° C.): 530 mPas Solids content (1 g, 1 h, 180° C.): 39.0%

The enamels prepared in Examples 1 to 4 are applied on a standard wire-enamelling machine. Single-coat and two-coat enamelling is carried out. In the case of two-coat enamelling, the polyester wire enamels were used as basecoat, which was coated over in-line with a commercial polyamideimide wire enamel, preferably Allotherm 602 L-35 (Dr. Beck, BASF L+F) as topcoat. This process is known and constitutes the state of the art.

| Enamelling conditions: | |
|---|---|
| Single-coat enamelling | |
| Oven: | MAG AW/1A |
| Temperature: | 520° C. |
| Application system: | jets |
| Wire diameter: | 0.71 mm |
| Take-off speed: | 32 m/min |
| Number of passes: | 10 |
| Degree of increase: | 2 L |

-continued

Enamelling conditions:

Two-coat enamelling

| Oven: | MAG AW/1A |
|---|---|
| Temperature: | 520° C. |
| Application system: | jets |
| Wire diameter: | 0.71 mm |
| Take-off speed: | 30 m/min |
| Number of passes: | |
| Basecoat | 8 |
| Topcoat | 2 |
| Degree of increase: | 2 L |

The enamelled wires were tested in accordance with IEC 851. The results are summarized in Table 1 below:

TABLE 1

SINGLE-COAT ENAMELLING

| Example | Surface | Adhesion on winding, 1 × d + pre-extension | Thermal shock, 1 × d, 30 min, + pre-extension | Thermal pressure, 2 min | tan δ steep rise |
|---|---|---|---|---|---|
| Example 1 | very good | 30% | 10%, 200° C. | 420° C. | 165° C. |
| Example 2 | very good | 30% | 0%, 200° C. | 430° C. | 171° C. |
| Example 3 | very good | 25% | 10%, 200° C., 20%, 3 × d, 200° C. (NEMA) | 450° C. | 179° C. |
| Example 4 | very good | 25% | 0%, 155° C. | 400° C. | 150° C. |

The wire enamelled with a single coat of a THEIC-modified polyester enamel (Example 4) is distinguished by very good adhesion on winding 1×d with a pre-extension of 25% and a high softening temperature of 400° C. The poor thermal shock 1×d of 155° C. and a low tan δ steep rise of 150° C. are disadvantageous. However, the THEIC-modified polyester enamel can also be used as a basecoat and be overcoated with a polyamideimide topcoat. These so-called two-coat wires constitute the state of the art. In the insulation systems built up in this way, the basecoat ensures not only good adhesion but also a high softening temperature, while the topcoat contributes high resistance to thermal shock.

The wire enamels according to the invention which are prepared in Examples 1–3 correspond to the standard, having a good adhesion to the copper wire, and exhibit an excellent surface quality. The single-coat-enamelled wires lie, in their thermal shock resistance and thermal pressure, markedly above the level of the wires enamelled with conventional THEIC polyesters. The wires enamelled with the wire enamels according to the invention are distinguished by a thermal shock, 1×d, 200° C. with a pre-extension of from 0 to 10% and by a thermal pressure of 420°–450° C. The tan δ steep rise is between 165° C. and 179° C. The level of values of these wires corresponds to those specified in accordance with IEC 317-8 with polyesterimide-enamelled wires of class 180. Wires of thermal class 180 enamelled exclusively with polyester wire enamels without a topcoat were not previously known.

The thermal shock resistance and thermal pressure of the two-coat-enamelled wires are also markedly above the level of the two-coat wires enamelled with conventional THEIC polyesters as basecoat. The two-coat wires enamelled with the wire enamels according to the invention are distinguished by a thermal shock, 1×d, 300° C. with a pre-extension of from 0 to 25% and by a thermal pressure of 420°–450° C. The tan δ steep rise is between 164° C. and 190° C.

Example 5

Preparation of a 2,6-Naphthalenedicarboxylic Acid-Containing Imide-Modified Polyester 1

59.76 g of ethylene glycol, 59.79 g of glycerol, 23.11 g of xylene, 87.30 g [lacuna] dimethyl terephtalate, 109.79 g of dimethyl 2,6-naphthalenedicarboxylate and 0.36 g of butyl titanate are heated at 200° C. to prepare a polyester resin. During this process, 65.82 g of distillate are obtained. At 200° C., 354.79 g of cresol are added immediately, and 76.26 g of diaminodiphenylmethane and 148.13 g of trimellitic anhydride are added after cooling to 90° C. An imide-modified polyester is prepared by heating to 200° C. During this process, a further 30.79 g of distillate are obtained. The mixture is cooled to 140° C., and 40.42 g of cresol and 40.29 g of solvent naphtha are added.

| Viscosity, 23° C. | 55 Pas |
|---|---|
| Solids content (2 g, 1 h, 200° C.) | 51% |

Example 6

Preparation of a 2,6-Naphthalenedicarboxylic Acid-Containing Imide-Modified Polyester 2

58.60 g of ethylene glycol, 58.60 g of glycerol, 22.47 g of xylene, 215.30 g [lacuna] dimethyl 2,6-naphtalenedicarboxylate and 0.17 g of lead(II) oxide are heated at 200° C. to prepare a polyester resin. During this process, 63.73 g of distillate are obtained. At 200° C., 347.48 g of cresol are added immediately, and 74.79 g of diamino-diphenylmethane and 145.27 g of trimellitic anhydride are added after cooling to 90° C. An imide-modified polyester is prepared by heating to 200° C. During this process, a further 26.77 g of distillate are obtained. The mixture is cooled to 140° C., and 38.66 g of cresol and 38.66 g of solvent naphtha are added.

| Viscosity, 23° C. | 60 Pas |
|---|---|
| Solids content (2 g, 1 h, 200° C.) | 52% |

Example 7

(Comparison Example)

Preparation of an Imide-Modified Polyester 61.21 g of ethylene glycol, 61.21 g of glycerol, 23.47 g of xylene, 178.76 g of dimethyl terephthalate and 0.18 g of lead(II) oxide are heated at 200° C. to prepare a polyester resin. During this process, 70.13 g of distillate are obtained. At 200° C., 362.85 g of cresol are added immediately, and 78.10 g of 4,4'-diaminodiphenylmethane and 151.70 g of trimellitic anhydride are added after cooling to 90° C. An imide-modified polyester is prepared by heating to 200° C. During this process, a further 25.13 g of distillate are obtained. The mixture is cooled to 140° C., and 42.15 g of cresol and 40.37 g of solvent naphtha are added.

| | |
|---|---|
| Viscosity, 23° C. | 25 Pas |
| Solids content (2 g, 1 h, 200° C.) | 50% |

Example 8

Preparation of a Polyurethane Enamel

At a temperature of less than 30° C., 7.19 g of 1,3-butanediol, 9.18 g of trimethylolpropane and 111.83 g of 4,4'-diphenylmethane diisocyanate are added to 21.00 g of 1-methoxypropyl 2-acetate. The mixture is heated with stirring to 80°–100° C. and maintained at this temperature until the isocyanate content adopts a value of between 12 and 17%. The mixture is cooled to 50°–60° C., and 171.71 g of cresol and 57.72 g of solvent naphtha are added at this temperature. The mixture is heated to 80°–100° C. and the temperature is maintained until the isocyanate content adopts a value of less than 0.2%. The mixture is then cooled to 40°–60° C. 281.66 g of imide-modified ester from Example 5, 229.82 g of cresol, 107.74 g of solvent naphtha and 2.15 g of zinc octoate are added and the mixture is stirred for three hours.

| | |
|---|---|
| Efflux time, DIN 53 211, 4 mm at 23° C. | 48 s |
| Solids content (1 g, 1 h, 180° C.) | 29.4% |

Example 9

Preparation of a Polyurethane Enamel

At a temperature of less than 30° C., 7.62 g of 1,3-butanediol, 9.73 g of trimethylolpropane and 118.51 g of 4,4'-diphenylmethane diisocyanate are added to 22.25 g of 1-methoxypropyl 2-acetate. The mixture is heated with stirring to 80°–100° C. and maintained at this temperature until the isocyanate content adopts a value of between 12 and 17%. The mixture is cooled to 50°–60° C., and 181.96 g of cresol and 61.17 g of solvent naphtha are added at this temperature. The mixture is heated to 80°–100° C. and the temperature is maintained until the isocyanate content adopts a value of less than 0.2%. The mixture is then cooled to 40°–60° C. 238.78 g of imide-modified ester from Example 5, 243.53 [lacuna] of cresol, 114.17 g of solvent naphtha and 2.28 g of zinc octoate are added and the mixture is stirred for three hours.

| | |
|---|---|
| Efflux time, DIN 53 211, 4 mm at 23° C. | 48 s |
| Solids content (1 g, 1 h, 180° C.) | 30.0% |

Example 10

Preparation of a Polyurethane Enamel

At a temperature of less than 30° C., 6.72 g of 1,3-butanediol, 8.58 g of trimethylolpropane and 104.48 g of 4,4'-diphenylmethane diisocyanate are added to 19.63 g of 1-methoxypropyl 2-acetate. The mixture is heated with stirring to 80°–100° C. and maintained at this temperature until the isocyanate content adopts a value of between 12 and 17%. The mixture is cooled to 50°–60° C., and 160.47 g of cresol and 53.94 g of solvent naphtha are added at this temperature. The mixture is heated to 80°–100° C. and the temperature is maintained until the isocyanate content adopts a value of less than 0.2%. The mixture is then cooled to 40°–60° C. 235.10 g of imide-modified ester from Example 6, 308.31 [lacuna] of cresol, 100.72 g of solvent naphtha and 2.05 g of zinc octoate are added and the mixture is stirred for three hours.

| | |
|---|---|
| Efflux time, DIN 53 211, 4 mm at 23° C. | 59 s |
| Solids content (1 g, 1 h, 180° C.) | 29.8% |

Example 11

Preparation of a Polyurethane Enamel

At a temperature of less than 30° C., 5.90 g of 1,3-butanediol, 7.52 g of trimethylolpropane and 91.66 g of 4,4'-diphenylmethanediisocyanate are added to 17.22 g of 1-methoxypropyl 2-acetate. The mixture is heated with stirring to 80°–100° C. and maintained at this temperature until the isocyanate content adopts a value of between 12 and 17%. The mixture is cooled to 50°–60° C., and 140.68 g of cresol and 47.28 g of solvent naphtha are added at this temperature. The mixture is heated to 80°–100° C. and the temperature is maintained until the isocyanate content adopts a value of less than 0.2%. The mixture is then cooled to 40°–60° C. 239.19 g of imide-modified ester from Example 6, 317.09 [lacuna] of cresol, 131.63 g of solvent naphtha and 1.83 g of zinc octoate are added and the mixture is stirred for three hours.

| | |
|---|---|
| Efflux time, DIN 53 211, 4 mm at 23° C. | 50 s |
| Solids content (1 g, 1 h, 180° C.) | 27.0% |

Example 12

Preparation of a Polyurethane Enamel

At a temperature of less than 30° C., 6.03 g of 1,3-butanediol, 7.69 g of trimethylolpropane and 93.72 g of 4,4'-diphenylmethane diisocyanate are added to 17.62 g of 1-methoxypropyl 2-acetate. The mixture is heated with stirring to 80°–100° C. and maintained at this temperature until the isocyanate content adopts a value of between 12 and 17%. The mixture is cooled to 50°–60° C., and 143.92 g of cresol and 48.38 g of solvent naphtha are added at this temperature. The mixture is heated to 80°–100° C. and the temperature is maintained until the isocyanate content adopts a value of less than 0.2%. The mixture is then cooled to 40°–60° C. 257.72 g of imide-modified ester from Example 6, 297.62 [lacuna] of cresol, 125.46 g of solvent naphtha and 1.84 g of zinc octoate are added and the mixture is stirred for three hours.

| | |
|---|---|
| Efflux time, DIN 53 211, 4 mm at 23° C. | 65 s |
| Solids content (1 g, 1 h, 180° C.) | 29.1% |

Example 13

(Comparison Example)

Preparation of a Polyurethane Enamel

At a temperature of less than 30° C., 7.21 g of 1,3-butanediol, 9.20 g of trimethylolpropane and 112.07 g of 4,4'-diphenylmethane diisocyanate are added to 21.05 g of 1-methoxypropyl 2-acetate. The mixture is heated with stirring to 80°–100° C. and maintained at this temperature until the isocyanate content adopts a value of between 12 and 17%. The mixture is cooled to 50°–60° C., and 172.08 g of cresol and 57.84 g of solvent naphtha are added at this temperature. The mixture is heated to 80°–100° C. and the temperature is maintained until the isocyanate content adopts a value of less than 0.2%. The mixture is then cooled to 40°–60° C. 280.12 g of imide-modified ester from Example 7, 230.50 [lacuna] of cresol, 107.78 g of solvent naphtha and 2.15 g of zinc octoate are added and the mixture is stirred for three hours.

| | |
|---|---|
| Efflux time, DIN 53 211, 4 mm at 23° C. | 63 s |
| Solids content (1 g, 1 h, 180° C.) | 29.0% |

The enamels prepared in Examples 8 to 13 are applied on a standard wire-enamelling machines.

| Enamelling conditions: | |
|---|---|
| Oven: | MAG AW/1A |
| Temperature: | 400° C. |
| Application system: | jets |
| Wire diameter: | 0.50 mm |
| Number of passes: | 10 |
| Degree of increase: | 2 L |

The enamelled wires were tested in accordance with IEC 851. The results are summarized in Tables 2 and 3 below:

TABLE 2

Take-off speed 50 m/min

| Example | Adhesion on winding, 1 × d + pre-extension | Thermal shock, 1 × d, 30 min | Thermal pressure, 2 min | tan δ steep rise | Flux time at 420° C. |
|---|---|---|---|---|---|
| Example 8 | 20% | 200° C. | 220° C. | 153° C. | 1.4 s |
| Example 9 | 25% | 200° C. | 240° C. | 154° C. | 1.5 s |
| Example 10 | 25% | 200° C. | 260° C. | 171° C. | 1.5 s |
| Example 11 | 25% | 200° C. | 260° C. | 173° C. | 1.5 s |
| Example 12 | 25% | 200° C. | 260° C. | 170° C. | 1.5 s |
| Example 13 | 20% | 185° C. | 240° C. | 145° C. | 1.5 s |

TABLE 3

Take-off speed 60 m/min

| Example | Adhesion on winding, 1 × d + pre-extension | Thermal shock, 1 × d, 30 min | Thermal pressure, 2 min | tan δ steep rise | Flux time at 420° C. | Flux time at 375° C. |
|---|---|---|---|---|---|---|
| Example 8 | 25% | 200° C. | 240° C. | 156° C. | <1 s | 1.5 s |
| Example 9 | 25% | 200° C. | 260° C. | 158° C. | <1 s | 1.5 s |
| Example 13 | 20% | 185° C. | 220° C. | 140° C. | 1.0 s | 4.0 s |

The wire enamels according to the invention prepared in Examples 8–12 are stable on storage and, in comparison to the standard, have a predominantly better adhesion to 0.5 mm copper wire. The wires coated with the enamels according to the invention show a significant increase, in the thermal shock resistance and in some cases also in the thermal pressure, relative to the level of the wires enamelled with conventional polyurethane enamels (Example 13). Furthermore, at from 153° C. to 173° C., the tan δ steep rise is likewise higher than in the comparison example.

The technical advantage of these wires is all the more significant since an improved thermal value level can be achieved without the loss of a short flux time. It should also be emphasized that in comparison to Example 13, optimum properties can be achieved at a 20% higher take-off speed. At a speed of 60 m/min, furthermore, there is a significant decrease in the flux time to below one second at 420° C. or a much lower solder bath temperature of 375° C. while retaining the flux time. A higher take-off speed and a lower flux time or a lower solder bath temperature are significant technical advantages.

Example 14

2,6-Naphthalenedicarboxylic Acid-Modified THEIC Polyesterimide 72.9 g of ethylene glycol, 192.2 g of THEIC, 83.3 g of dimethyl terephthalate, 104.4 g of dimethyl 2,6-naphthalenedicarboxylate, 220.1 g of trimellitic anhydride, 112.0 g of 4,4'-diaminodiphenylmethane and 0.7 g of tetra-n-butyl titanate are heated at 200° C. to prepare a polyesterimide resin. 96.8 g of distillate are obtained. At 200° C., the batch is diluted with 808.5 g of cresol. The cooled cresolic solution is diluted with 288.5 g of solvent naphtha and catalysed with 11.4 g of cresyl titanate.

| | |
|---|---|
| Viscosity: | 950 mPas |
| Solids content (1 g, 1 h, 180° C.) | 38.9% |

Example 15

(Comparison Example)

THEIC Polyesterimide

In a one-pot process, 72.9 g of ethylene glycol, 194.2 g of THEIC, 166.6 g of dimethyl terephthalate, 220.1 g of trimellitic anhydride, 112.0 g of 4,4'-diaminodiphenylmethane and 0.7 g of tetra-n-butyl titanate are heated at 200° C. to prepare a polyesterimide resin. 95.1 g of distillate are obtained. At 200° C., the batch is diluted with 808.5 g of cresol. The cooled cresolic solution is diluted with 288.5 g of solvent naphtha and catalysed with 11.4 g of cresyl titanate.

| | |
|---|---|
| Viscosity: | 810 mPas |
| Solids content (1 g, 1 h, 180° C.) | 39.8% |

The two enamels were applied and were tested in accordance with IEC 851.
Enamelling Conditions:
Oven: MAG AW/1A
Temperature: 520° C.
Application system: jets
Wire diameter: 0.71 mm
Take-off speed: 32 m/min
Number of passes: 10
Degree of increase: 2 L
The application results for the enamels are listed in Table 4. The enamel of Example 14 contains as binder a THEIC polyesterimide modified with 2,6-naphthalenedicarboxylic acid. The enamel from Example 15 is a conventional polyesterimide as comparison.

As evident from the results, there is a considerable improvement in the adhesion to the wire and in the thermal shock by the incorporation of 2,6-naphthalenedicarboxylic acid.

TABLE 4

Enamelling results for polyesterimides

| Example | Surface | Adhesion on winding, 1 × d + pre-extension | Thermal shock, 1 × d + pre-extension, 30 min | Thermal pressure, 2 min |
|---|---|---|---|---|
| Example 14 | very good | 30% | 10%, 200° C. | 390° C. |
| Example 15 | very good | 25% | 0%, 180° C. | 390° C. |

We claim:

1. A wire-coating composition, comprising 0.5 to 5.0% by weight, based on the overall weight of the wire-coating composition of a phenolic resin and
   a) from 15 to 65% by weight, based on the overall weight of the wire-coating composition, of one or more polyester resins comprising the reaction product of one or more polyhydric alcohols and at least one acid component comprising an acid or acid derivative selected from the group consisting of naphthalenedicarboxylic acid, esterifiable derivatives thereof, and mixtures thereof,
   b) from 15 to 60% by weight, based on the overall weight of the wire-coating composition, of one or more polyesterimides comprising the reaction product of one or more polyhydric alcohols and at least one acid component comprising an acid or acid derivative selected from the group consisting of naphthalenedicarboxylic acid, esterifiable derivatives thereof, and mixtures thereof, or
   c) from 18 to 40% by weight, based on the overall weight of the wire-coating composition, of one or more hydroxyl-containing polyesters comprising the reaction product of one or more polyhydric alcohols and at least one acid component comprising an acid or acid derivative selected from the group consisting of naphthalenedicarboxylic acid, esterifiable derivatives thereof, and mixtures thereof, and one or more isocyanate components whose free isocyanate groups are completely blocked.

2. A wire-coating composition, comprising
   a) from 15 to 65% by weight, based on the overall weight of the wire-coating composition, of one or more polyester resins comprising the reaction product of a mixture of diols and triols, wherein at least one triol is tris(2-hydroxyethyl)isocyanurate, and at least one acid component comprising an acid or acid derivative selected from the group consisting of naphthalenedicarboxylic acid, esterifiable derivatives thereof, and mixtures thereof,
   b) from 15 to 60% by weight, based on the overall weight of the wire-coating composition, of one or more polyesterimides comprising the reaction product of a mixture of diols and triols wherein at least one triol is tris(2-hydroxyethyl)isocyanurate, and at least one acid component comprising an acid or acid derivative selected from the group consisting of naphthalenedicarboxylic acid, esterifiable derivatives thereof, and mixtures thereof, or
   c) from 18 to 40% by weight, based on the overall weight of the wire-coating composition, of one or more hydroxyl-containing polyesters comprising the reaction product of a mixture of diols and triols wherein at least one triol is tris(2-hydroxyethyl)isocyanurate, and at least one acid component comprising an acid or acid derivative selected from the group consisting of naphthalenedicarboxylic acid, esterifiable derivatives thereof, and mixtures thereof, and one or more isocyanate components whose free isocyanate groups are completely blocked.

3. A wire-coating composition, comprising 0.5 to 5.0% by weight, based on the overall weight of the wire-coating composition of a phenolic resin and
   a) from 15 to 65% by weight, based on the overall weight of die wire-coating composition, of one or more polyester resins comprising the reaction product of a mixture of diols and triols, wherein at least one triol is tris(2-hydroxyethyl)isocyanurate, and at least one acid component comprising an acid or acid derivative selected from the group consisting of naphthalenedicarboxylic acid, esterifiable derivatives thereof, and mixtures thereof,
   b) from 15 to 60% by weight, based on the overall weight of the wire-coating composition, of one or more polyesterimides comprising the reaction product of a mixture of diols and triols wherein at least one triol is tris(2-hydroxyethyl)isocyanurate, and at least one acid component comprising an acid or acid derivative selected from the group consisting of naphthalenedicarboxylic acid, esterifiable derivatives thereof, and mixtures thereof, or
   c) from 18 to 40% by weight, based on the overall weight of the wire-coating composition, of one or more hydroxyl-containing polyesters comprising the reaction product of a mixture of diols and triols wherein at least one triol is tris(2-hydroxyethyl)isocyanurate, and at least one acid component comprising an acid or acid derivative selected from the group consisting of naphthalenedicarboxylic acid, esterifiable derivatives thereof, and mixtures thereof, and one or more isocyanate components whose free isocyanate groups are completely blocked.

4. Wire-coating composition according to claim 3, wherein the at least one acid component comprises an acid selected from the group consisting of 1,4-, 1,8-, 2,3- 2,6-naphthalenedicarboxylic acid and mixtures thereof.

5. Wire-coating composition according to claim 3, wherein the acid component of the at least one resin further comprises further dicarboxylic acids comprising one or more acids selected from the group consisting of oxalic acid, malonic acid, succinic acid, glutaric acid, adipic acid, pimelic acid, acelaic acid, sebacic acid, maleic acid, fumaric acid, sorbic acid, phthalic acid, terephthalic acid, isophthalic acid and mixtures thereof.

6. Wire-coating composition according to claim 3, wherein the acid component comprises
   a) from 1 to 100 mol % of naphthalenedicarboxylic acid and
   b) from 0 to 99 mol % of further dicarboxylic acids.

7. Wire-coating composition according to claim 3, wherein the mixture of diols and triols are selected from the group consisting of ethylene glycol, 1,2-propylene glycol, 1,3-propylene glycol, 1,2-butanediol, 1,3-butanediol, 1,4-butanediol, 1,5-pentanediol, neopentylglycol, diethylene glycol, triethylene glycol, glycerol, trimethylolethane, trimethylolpropane, and mixtures thereof.

8. A process for the preparation of a wire-coating composition of claim 3, comprising subjecting at least one acid component selected from the group consisting of naphthalenedicarboxylic acid(s), esterifiable derivatives thereof, and mixtures thereof, to condensation with a mixture of diols and triols, wherein at least one triol is tris(2-hydroxyethyl)isocyanurate, in an organic solvent, and and mixing the condensation product with one or more additional components selected from the group consisting of a catalyst, a phenolic resin, other resins, auxiliaries, additives and mixtures thereof, to give a wire-coating composition.

9. The process for the preparation of wire-coating compositions according to claim 8, wherein imido-containing or imido-forming starting materials are subjected to condensation with the at least one acid component and the mixture of diols and triols, wherein at least one triol is tris(2-hydroxyethyl)isocyanurate.

10. The process for the preparation of wire-coating compositions according to claim 8, comprising condensing resin a), b) or c) in a solvent.

11. The wire coating composition of claim 3 further comprising one or more additional components selected from the group consisting of further dicarboxylic acids, further dicarboxylic acid derivatives, catalysts, organic solvents, additives, auxiliaries, imido-containing materials, imido-forming materials, other resins or polymers, and mixtures thereof.

12. The process for the preparation of wire coating compositions of claim 8 comprising condensing the resin a), b) or c) in a melt and then dissolving the resulting melt in an organic solvent.

* * * * *